United States Patent

[11] 3,609,165

| [72] | Inventors | Harold W. Heine<br>Lewisburg;<br>Richard H. Weese, Morrisville; Robert A. Cooper, Knoxville, all of Pa. |
|---|---|---|
| [21] | Appl. No. | 745,980 |
| [22] | Filed | July 19, 1968 |
| [45] | Patented | Sept. 28, 1971 |
| [73] | Assignee | Research Corporation<br>New York, N.Y. |

[54] 1,3-DIAZABICYCLO [3.1.0] HEX-3-ENES
1 Claim, No Drawings

[52] U.S. Cl. .................................................. 260/309.6,
96/89, 96/90 PC, 106/193 P, 252/300, 260/239 E,
350/160 R
[51] Int. Cl. ........................................... C07d 49/30

[50] Field of Search........................................... 260/309.6;
96/90 PC

[56] References Cited
OTHER REFERENCES

Heine et al., J. Org. Chem. 32(9), 2708– 2710 (1967).
Kirchner, Ann. Chem. 625, 98– 103 (1959).

*Primary Examiner*—Henry R. Jiles
*Assistant Examiner*—G. Thomas Todd
*Attorney*—Stowell & Stowell ABSTRACT: 4,6-diaryl-1,3-diazabicyclo [3.1.0] hex-3-enes are made by reacting trans-2-aryl-3-aroylaziridines with aldehydes and ketones in ammoniacal alcohol. The new compounds and their acid addition salts are photochromic.

1,3-DIAZABICYCLO [3.1.0] HEX-3-ENES

This invention relates to novel 1,3-diazabicyclo [3.1.0] hex-3-enes and to methods of making them.

The new compounds are made by adding an excess of aldehyde or ketone to an ethanolic solution of a trans-2-aryl-3-aroylaziridine and saturating the reaction mixture with ammonia. The corresponding 4,6-diaryl-1,3diazabicyclo [3.1.0] hex-3-ene gradually precipitates from the reaction mixture on standing at room temperature and can be recrystallized from 95 percent ethanol or other alcoholic solvents.

The reaction can be expedited by the presence of a small amount of ammonium ion which can be provided, for example, by the addition of ammonium bromide.

The reaction may be represented as follows:

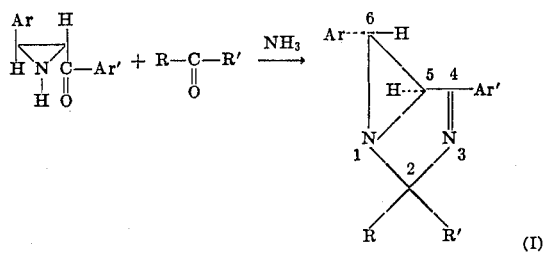

wherein Ar and Ar' represent phenyl or substituted phenyl, and R and R' separately or jointly represent hydrogen, or aliphatic or aryl groups.

EXAMPLE

Methods for making trans-2-aryl-3-aroylaziridines are described by Wieland, Ber., 37, 1150 (1904) and Cromwell et al., *J. Amer. Chem. Soc.*, 79, 3819 1957).

1 g. of trans-2-phenyl-3-p-nitrobenzoyl-aziridine is suspended in 20 ml. of absolute ethanol, 3 ml. of benzaldehyde and 0.1 g. of ammonium bromide is added and the mixture is saturated with ammonia. On standing at room temperature for 3 days a precipitate of 2,6-diphenyl-4-p-nitrophenyl-1,3-diazabicyclo [3.1.0] hex-3-ene, melting at 141°–142° C. on recrystallization from 95 percent ethanol, is filtered off.

Typical products obtained by the method of the invention as listed in the following table wherein the components Ar, R, R', Ar' of the general formulas in reaction equation (I) above are listed together with the melting points of the products.

| No. | Ar | R | R' | Ar' | M.P.,° C. |
|---|---|---|---|---|---|
| 1 | p-O$_2$NC$_6$H$_4$ | H | H | C$_6$H$_5$ | 179-181 |
| 2 | Same | H | CH$_3$ | C$_6$H$_5$ | 166-167 |
| 3 | do | H | n-C$_3$H$_7$ | C$_6$H$_5$ | 143-144 |
| 4 | do | H | i-C$_3$H$_7$ | C$_6$H$_5$ | 156-157 |
| 5 | do | H | C$_6$H$_5$ | C$_6$H$_5$ | 175-176 |
| 6 | m-O$_2$NC$_6$H$_4$ | H | C$_6$H$_5$ | C$_6$H$_5$ | 157-158 |
| 7 | C$_6$H$_5$ | H | C$_6$H$_5$ | C$_6$H$_5$ | 153-154 |
| 8 | C$_6$H$_5$ | H | C$_6$H$_5$ | p-O$_2$NC$_6$H$_4$ | 141-142 |
| 9 | p-O$_2$NC$_6$H$_4$ | H | p-O$_2$NC$_6$H$_4$ | C$_6$H$_5$ | 173-174 |
| 10 | Same | H | p-MeC$_6$H$_4$ | C$_6$H$_5$ | 154-155 |
| 11 | do | H | o-MeOC$_6$H$_4$ | C$_6$H$_5$ | 193-193.5 |
| 12 | do | CH$_3$ | CH$_3$ | C$_6$H$_5$ | 182-183 |
| 13 | C$_6$H$_5$ | CH$_3$ | CH$_3$ | p-O$_2$NC$_6$H$_4$ | 151-152 |
| 14 | p-ClC$_6$H$_4$ | CH$_3$ | CH$_3$ | C$_6$H$_5$ | 96-97 |
| 15 | p-O$_2$NC$_6$H$_4$ | CH$_3$ | C$_2$H$_5$ | C$_6$H$_5$ | 146-147 |
| 16 | Same | CH$_3$ | n-C$_3$H$_7$ | C$_6$H$_5$ | 149-150 |
| 17 | do | CH$_3$ | t-C$_4$H$_9$ | C$_6$H$_5$ | 128-129 |
| 18 | do | CH$_3$ | C$_6$H$_5$ | C$_6$H$_5$ | 195-197 |
| 19 | do | C$_2$H$_5$ | C$_2$H$_5$ | C$_6$H$_5$ | 168-169 |
| 20 | m-O$_2$NC$_6$H$_4$ | C$_2$H$_5$ | C$_2$H$_5$ | C$_6$H$_5$ | 97-98 |
| 21 | p-O$_2$NC$_6$H$_4$ | ▷— | ▷— | C$_6$H$_5$ | 181-183 |
| 22 | Same | —(CH$_2$)$_4$— | | C$_6$H$_5$ | 170-171 |
| 23 | do | —(CH$_2$)$_5$— | | C$_6$H$_5$ | 156-157 |
| 24 | do | —(CH$_2$)$_6$— | | C$_6$H$_5$ | 170-171 |
| 25 | do | —(CH$_2$)$_7$— | | C$_6$H$_5$ | 177-178 |
| 26 | do | —(CH$_2$)$_4$CH(CH$_3$)— | | C$_6$H$_5$ | 166-167 |
| 27 | do | —(CH$_2$)$_2$CH(CH$_3$)$_2$— | | C$_6$H$_5$ | 168-169 |
|  |  | CH$_3$ |  |  |  |
| 28 | do | C$_6$H$_5$ | C$_6$H$_5$ | C$_6$H$_5$ | 235-236 |

A rapid photochromic change occurs with all the 6-p-nitrophenyl-1,3-diazabicyclo [3.1.0] hex-3-enes when exposed to sunlight. The initially white or cream crystals are converted to deep blue crystals. The blue fades after several days in the dark. The 6-phenyl and 6m-nitrophenyl compounds are not so sensitive to ultraviolet light, although a red coloration is produced which quickly fades in the dark.

The hydrochlorides of the new compounds are easily prepared by passing dry hydrogen chloride into an ether solution of the compounds. The salts of the compounds are also photochromic.

The compounds are converted into pyrimidines by treatment with methanolic sodium methoxide. For example, the compound of the illustrative example (compound 8 of the table) is converted into 2,436 -diphenyl-6-p-nitrophenyl-pyrimidine by dissolving 3.55 mg. of compound 8 in 15 ml. of 0.13M methanolic sodium methoxide. During 24 hours at room temperature the pyrimidine, melting at 212°–213° C. after recrystallization from 95 percent ethanol, slowly precipitated.

The work disclosed herein was supported in part by a grant from the Department of Health, Education and Welfare.

We claim:

1. A member selected from the group consisting of 1,3-Diazabicyclo [3.1.0] hex-3-enes of the formula

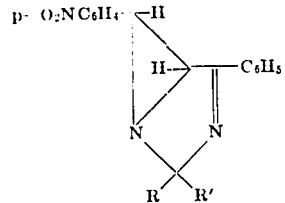

wherein R and R' taken separately are hydrogen, lower alkyl or phenyl, and wherein R and R' taken together are alkylene having four to seven carbon atoms inclusive.